United States Patent
Thomas et al.

(10) Patent No.: US 11,339,305 B2
(45) Date of Patent: May 24, 2022

(54) SUBSTRATE COATED WITH NON-STICK COATING RESISTANT TO ABRASION AND SCRATCHING

(71) Applicant: THE CHEMOURS COMPANY FC, LLC, Wilmington, DE (US)

(72) Inventors: Philippe Andre Fernand Thomas, Helecine (BE); Wim Marie-Thérèse Jacques Beatse, Kontich (BE)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 359 days.

(21) Appl. No.: 15/888,065

(22) Filed: Feb. 4, 2018

(65) Prior Publication Data

US 2018/0223122 A1 Aug. 9, 2018

Related U.S. Application Data

(60) Provisional application No. 62/455,901, filed on Feb. 7, 2017.

(51) Int. Cl.
| | | |
|---|---|---|
| *C09D 127/18* | (2006.01) | |
| *B05D 1/02* | (2006.01) | |
| *B05D 3/02* | (2006.01) | |
| *B05D 7/00* | (2006.01) | |
| *A47J 36/02* | (2006.01) | |

(52) U.S. Cl.
CPC .............. *C09D 127/18* (2013.01); *B05D 1/02* (2013.01); *B05D 3/0254* (2013.01); *B05D 7/587* (2013.01); *A47J 36/025* (2013.01); *C08L 2205/025* (2013.01)

(58) Field of Classification Search
None
See application file for complete search history.

(56) References Cited

U.S. PATENT DOCUMENTS

| | | | |
|---|---|---|---|
| 4,259,375 A | 3/1981 | Vassiliou | |
| 5,667,891 A * | 9/1997 | Batzar | A47J 36/02 |
| | | | 428/389 |
| 5,707,688 A | 1/1998 | Batzar et al. | |
| 5,711,995 A | 1/1998 | Batzar | |
| 5,718,963 A | 2/1998 | Batzar | |
| 5,728,455 A | 3/1998 | Batzar | |
| 6,291,054 B1 | 9/2001 | Thomas et al. | |
| 6,761,964 B2 | 7/2004 | Tannenbaum | |
| 7,772,311 B2 | 8/2010 | Adams et al. | |
| 8,227,072 B2 | 7/2012 | Le Bris et al. | |
| 8,499,963 B2 | 8/2013 | Muller et al. | |
| 2002/0002229 A1* | 1/2002 | Thomas | A47J 36/02 |
| | | | 524/430 |
| 2007/0117900 A1* | 5/2007 | Lee | C08K 3/22 |
| | | | 524/431 |
| 2008/0237241 A1 | 10/2008 | Buffard et al. | |
| 2009/0004434 A1 | 1/2009 | Parent et al. | |
| 2011/0092850 A1 | 4/2011 | Kulkarni et al. | |
| 2012/0156398 A1 | 6/2012 | Kim | |

FOREIGN PATENT DOCUMENTS

| | | |
|---|---|---|
| EP | 0 580 557 B1 | 8/1995 |
| EP | 1 016 466 A2 | 7/2000 |
| EP | 2 407 306 B1 | 1/2012 |
| WO | 97/25159 A2 | 7/1997 |

OTHER PUBLICATIONS

International Search Report and Written Opinion for PCT/US2018/016777, dated May 2, 2018, Authorized Officer Bruno Gatinet.

* cited by examiner

*Primary Examiner* — Cheng Yuan Huang
(74) *Attorney, Agent, or Firm* — Kraig Haverstick; Keith Palmer

(57) ABSTRACT

A substrate coated with a non-stick fluoropolymer coating is provided, the coating having excellent abrasion and scratch resistance. The coating contains: i.) a continuous primer layer adhered to the substrate containing a polymer binder, a first fluoropolymer and first inorganic film hardner particles, ii.) a discontinuous midcoat layer containing aggregate particles adhered to the primer layer and distributed discontinuously across the surface of the primer layer so as to reveal exposed areas of the surface of the primer layer, wherein a portion of the aggregate particles are in clusters, and wherein the aggregate particles contain second fluoropolymer and second inorganic film hardner particles, and iii.) a topcoat layer containing a third fluoropolymer adhered to the midcoat layer and the exposed areas of the surface of the primer layer at points where there is no midcoat layer.

18 Claims, 6 Drawing Sheets

0.1 mm diameter

SUBSTRATE COATED WITH NON-STICK COATING RESISTANT TO ABRASION AND SCRATCHING

CROSS-REFERENCE TO RELATED APPLICATIONS

This application claims the benefit of U.S. provisional patent application No. 62/455,901, filed Feb. 7, 2017, which is incorporated by reference herein in its entirety.

TECHNICAL FIELD

This disclosure relates to substrates coated with non-stick fluoropolymer coatings having excellent abrasion and scratch resistance.

BACKGROUND TECHNOLOGY

Fluoropolymer resins, and especially perfluoropolymer resins, are known for their low surface energy and non-stick properties as well as thermal and chemical resistance. It has long been desirable to achieve longer wearing and more scratch-resistant non-stick polymer coatings on metal substrates. Of particular concern to achieving coated substrates with longer service life is the coated substrate's ability to withstand abrasion as well as its scratch resistance. "Scratch" is related to plastic deformation of the coating such as a cut from a knife, spatula or other metal tool. Abrasion refers to the amount of coating that is worn away as may occur by rubbing or sanding wherein the coating fibrillates and breaks away or shreds from the surface. In damaging a coated substrate, scratch may be followed by abrasion, in that a knife which causes plastic deformation of the coating, may also lead to the formation of fibrils which are subsequently worn away.

Prior efforts at achieving abrasion and scratch-resistant coatings have included EP 0 580 557 B1 and US 2008/0237241 A1, wherein to obtain non-stick coatings that have improved scratch resistance, various techniques have been developed. For a culinary article formed from a metal support, these techniques propose a non-stick coating deposited on the metal support, and that includes at least two coats based on fluoropolymer resin, one of these two coats being a discontinuous coat forming patterns. However, such prior art coatings are prone to cracks, crazing, blistering and "eruptions" of inorganic filler from the coating, and coating abrasion and scratching, which, over time, reduces the quality of the coating, which then rapidly loses its non-stick properties and utility.

The need is for non-stick coatings resistant to abrasion and scratching which overcome such drawbacks, especially coatings having improved scratch resistance over prior art non-stick coatings, while still maintaining their non-stick and abrasion properties over time.

SUMMARY

The present invention addresses the need for a durable, non-stick coating with superior abrasion and scratch resistance. Specifically the invention provides for a substrate coated with a non-stick coating resistant to abrasion and scratching, the non-stick coating comprising: i.) a continuous primer layer adhered to the substrate, the continuous primer layer comprising a polymer binder, a first fluoropolymer and first inorganic film hardner particles, ii.) a discontinuous midcoat layer comprising aggregate particles adhered to the primer layer and distributed discontinuously across the surface of the primer layer so as to reveal exposed areas of the surface of the primer layer, wherein from about 5 percent to 20 percent of the aggregate particles are in clusters having a diameter of at least about 0.1 mm and height of at least about 0.016 mm as measured from the surface of the primer layer, and wherein the aggregate particles comprise a second fluoropolymer and second inorganic film hardner particles, and iii.) a topcoat layer comprising a third fluoropolymer adhered to the midcoat layer and the exposed areas of the surface of the primer layer at points where there are no particles of the midcoat layer.

In one embodiment, the first fluoropolymer is PTFE, the second fluoropolymer is the same or different PTFE, and the third fluoropolymer is PFA or MFA.

In one embodiment, the fluoropolymers as a component of each layer of the coating comprise about 10 to 45 weight percent of all cured components of the primer layer, at least about 70 weight percent of all cured components of the midcoat layer, and at least about 90 weight percent of all cured components of the topcoat layer.

In one embodiment, the average particle size of the first inorganic film hardner particles in the primer layer ranges from about 10 to 60 microns, and the average particle size of the second inorganic film hardner particles in the midcoat layer ranges from about 5 to 44 microns.

In one embodiment, the aggregate particles comprising fluoropolymer and inorganic film hardner particles have an average particle size of from about 0.1 to 4 mm, and in another embodiment, from about 0.1 to 1 mm.

In one embodiment, the clusters have a diameter at least about 0.2 mm. In another embodiment, the clusters have a diameter at least about 0.2 mm to 4 mm.

In one embodiment, about 15 percent of the number of aggregate particles are contained in clusters.

In one embodiment, the midcoat layer has a weight per square meter on a cured basis of from about 0.05 to 0.25 g/m$^2$, in another embodiment, from about 0.1 to 0.2 g/m$^2$, and in another embodiment, from about 0.12 to 0.18 g/m$^2$.

The details of one or more embodiments of this disclosure are set forth in the accompanying drawings and the description below. Other features, objects and advantages of this disclosure will be apparent from the description and drawings, and from the claims.

BRIEF DESCRIPTION OF THE DRAWINGS

Embodiments are illustrated in the accompanying figures to improve understanding of concepts as presented herein. Skilled practitioners will appreciate that objects in the figures are illustrated for simplicity and are not necessarily drawn to scale. For example, the dimensions of some of the objects in the figures may be exaggerated relative to other objects to help to improve understanding of these embodiments.

DETAILED DESCRIPTION

Figure 1:
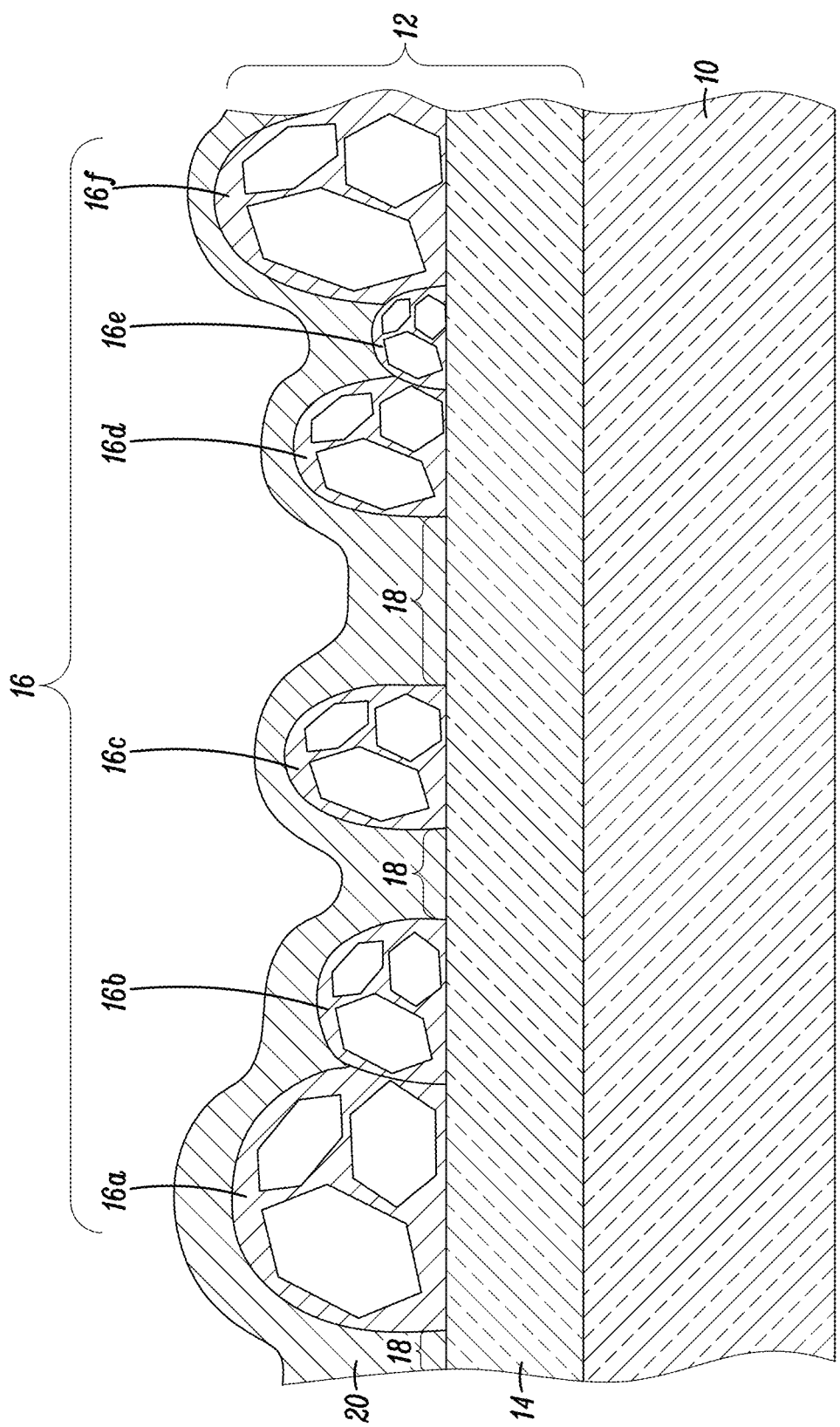
FIG. 1 is a schematic representation of a transverse cross section of a coating of the present disclosure.

Aspects and embodiments described above are merely exemplary and not limiting. After reading this specification, skilled artisans appreciate that other aspects and embodiments are possible without departing from the scope of the invention. Other features and benefits of any one or more of the embodiments will be apparent from the following detailed description, and from the claims.

Fluoropolymer

In one embodiment fluoropolymer of the present non-stick coating is non-melt fabricable polytetrafluoroethylene (PTFE), for simplicity in formulating the composition for coating, and the fact that PTFE has the highest heat stability among the fluoropolymers. In one embodiment, the PTFE has a melt viscosity of at least about $1 \times 10^8$ Pa·s at 380° C. In another embodiment, the PTFE can also contain repeating units arising from copolymerization of a small amount of comonomer modifier, which improves film-forming capability during baking (fusing) of present coatings comprising such PTFE. Example comonomers are perfluoroolefins such as hexafluoropropylene (HFP) or perfluoro(alkyl vinyl) ether (PAVE) wherein the alkyl group contains 1 to 5 carbon atoms, for example, perfluoro(propyl vinyl ether) (PPVE). The amount of such modifier will be insufficient to confer melt-fabricability to the PTFE and is generally no more than about 0.5 mole percent of the fluoropolymer. In one embodiment, for any given layer of the present coating, a mixture of PTFEs having different melt viscosities are used as a blend, the blend having a single (blended) melt viscosity to form the fluoropolymer component. In one embodiment, for any given layer of the present coating, a single PTFE is used and the fluoropolymer has a single chemical constitution and melt viscosity.

In one embodiment, for any given layer of the present coating, fluoropolymer of the present non-stick coating is independently selected from melt-fabricable fluoropolymers and perfluoropolymers. In another embodiment, for any given layer of the present coating, the melt-fabricable fluoropolymer is combined (blended) with PTFE. In another embodiment, for any given layer of the present coating, melt-fabricable fluoropolymer is used in place of PTFE in any or all of the layers of the present non-stick coating. Example melt-fabricable fluoropolymers include copolymers of tetrafluoroethylene (TFE) and at least one fluorinated monomer copolymerizable with TFE (comonomer), repeating units of which are present in the polymer in sufficient amount to reduce the melting point of the copolymer substantially below that of PTFE homopolymer, e.g., to a melting temperature less than 315° C. Preferred comonomers with TFE for the formation of such melt-fabricable fluoropolymers include perfluorinated monomers such as perfluoroolefins having 3-6 carbon atoms, and perfluoro(alkyl vinyl ethers) (PAVE) wherein the alkyl group contains 1-5 carbon atoms, especially 1-3 carbon atoms. Preferred such comonomers include hexafluoropropylene (HFP), perfluoro(ethyl vinyl ether) (PEVE), perfluoro(propyl vinyl ether) (PPVE) and perfluoro(methyl vinyl ether) (PMVE). Example melt-fabricable fluoropolymers include TFE copolymers such as FEP (TFE/HFP copolymer), PFA (TFE/PAVE copolymer), TFE/HFP/PAVE copolymer wherein PAVE is PEVE and/or PPVE and MFA (TFE/PMVE/PAVE copolymer wherein the alkyl group of PAVE has at least two carbon atoms). The molecular weight of the melt-fabricable TFE copolymers is not critical but is desirably sufficient to be film-forming and be able to sustain a molded shape so as to have integrity in the application of use. In one embodiment, the melt viscosity of the melt-fabricable TFE copolymer is at least about $1 \times 10^2$ Pa·s and up to about $60\text{-}100 \times 10^3$ Pa·s, as determined at 372° C. per the method of ASTM D1238 using a 5 kg weight.

Fluoropolymer present in each of the three layers of the present non-stick coating are alternately referred to herein as i.) "first fluoropolymer", referring to the fluoropolymer of the primer layer, ii.) "second fluoropolymer", referring to the fluoropolymer of the midcoat layer, and iii.) "third fluoropolymer", referring to the fluoropolymer of the topcoat layer. In one embodiment, each of the primer, midcoat and topcoat layers comprise the same fluoropolymer. In another embodiment, each of the primer, midcoat and topcoat layers independently comprise different fluoropolymers. In another embodiment, two of the primer, midcoat and topcoat layers comprise the same fluoropolymer, and the third layer comprises a different fluoropolymer. In another embodiment, any or each of the primer, midcoat and topcoat layers independently comprises a blend of different fluoropolymers. In a preferred embodiment, the first and second fluoropolymers comprise the same or different PTFE, and the third fluoropolymer comprises PFA (TFE/PAVE copolymer) or MFA (TFE/PMVE/PAVE copolymer wherein the alkyl group of PAVE has at least two carbon atoms).

The present fluoropolymers are commercially available as dispersions in water, which is their preferred form for use in forming the present coatings, and for ease of application and environmental stewardship. By "dispersion" is meant that the particles of fluoropolymer are stably dispersed in the aqueous medium, so that settling of the particles does not occur within the time between when the dispersions are formed and when they are used to form a coating. This is achieved by the small size of the fluoropolymer particles, typically on the order of about 0.18 to 0.3 micrometers, generally about 0.2 micrometers, and the use of surfactant in the aqueous dispersion to stabilize the dispersion. Such dispersions can be obtained directly by the process known as dispersion polymerization, optionally followed by concentration and/or further addition of surfactant.

Alternatively, the fluoropolymer component may be a fluoropolymer powder such as PTFE micropowder. In the case of the present primer layer, typically an organic liquid is used to achieve an intimate mixture of fluoropolymer and polymer binder. The organic liquid may be chosen because the chosen binder dissolves in that liquid. If the binder is not dissolved in the liquid, then the binder can be finely divided and be dispersed with the fluoropolymer in the liquid. The resultant coating composition can comprise fluoropolymer dispersed in organic liquid and polymer binder, either dispersed in the liquid or dissolved to achieve the intimate mixture desired. The characteristics of the organic liquid will depend upon the identity of the polymer binder and whether a solution or dispersion thereof is desired. Examples of such organic liquids include N-methylpyrrolidone, butyrolactone, high boiling aromatic solvents, alcohols, mixtures thereof, among others. The amount of the organic liquid will depend on the flow characteristics desired for the particular coating process.

In one embodiment, the fluoropolymer as a component of each layer of the present coating comprises about 10 to 45 weight percent of all cured components of the primer layer, at least about 70 weight percent of all cured components of the midcoat layer, and at least about 90 weight percent of all cured components of the topcoat layer.

Polymer Binder

In addition to fluoropolymer, the composition forming the primer layer also contains heat resistant polymer binder (herein alternately referred to as binder). The binder comprises polymer which is film-forming upon heating to fusion and is also thermally stable at its fusion temperature. Suitable binders are well known in primer applications for non-stick fluoropolymer finishes, for adhering a fluoropolymer-containing primer layer to a substrate and for film-forming within and as part of a primer layer. Fluoropolymer by itself has little to no adhesion to most smooth substrates. The binder is generally non-fluorine containing and yet adheres to the fluoropolymer as well as to substrates. Preferred binders are those that are soluble or solubilized in water or a mixture of water and organic solvent, which solvent is miscible with water. This solubility aids in the blending of the binder with the fluoropolymer component when in aqueous dispersion form.

In one embodiment, the polymer binder is polyamic acid salt which converts to polyamideimide (PAI) upon baking a coating composition containing polyamic acid salt to form the PAI-containing primer layer. This binder is preferred for high temperature stable coatings, because in the fully imidized form obtained by baking the polyamic acid salt, PAI binder has a continuous service temperature in excess of 250° C. The polyamic acid salt is generally available as polyamic acid having an inherent viscosity of at least about 0.1 as measured as a 0.5 wt % solution in N,N-dimethylacetamide at 30° C. It is dissolved in a coalescing agent such as N-methylpyrrolidone, and a viscosity-reducing agent, such a furfuryl alcohol and reacted with tertiary amine, preferably triethylamine, to form the salt, which is soluble in water, for example as described in U.S. Pat. No. 4,014,834. The resultant reaction medium containing the polyamic acid salt can then be blended with the fluoropolymer aqueous dispersion, and because the coalescing agent and viscosity-reducing agent are miscible in water, the blending produces a uniform coating composition. The blending can be achieved by simple mixing of the liquids together without using excess agitation to avoid coagulation of the fluoropolymer aqueous dispersion.

In another embodiment, polymer binder that can be used in the present primer layer include polyether sulfone (PES) and polyphenylene sulfide (PPS).

Whether the primer composition is applied as a liquid medium, wherein the liquid is water and/or organic solvent, the adhesion properties described above will manifest themselves upon drying and baking (curing) of the primer layer together with curing of the subsequently-applied midcoat and topcoat layers resulting in the present non-stick coating on the substrate.

In one embodiment, for simplicity a single binder is used as the binder component of the present primer layer. In another embodiment, multiple binders are used as the binder component of the present primer layer, especially where certain end-use properties are desired, such as flexibility, hardness or corrosion protection. Common such combinations of binders include PAI/PES, PAI/PPS and PES/PPS.

The proportions of fluoropolymer and binder in the primer layer composition, especially if the composition is used as a primer layer on a smooth substrate, is preferably in the weight ratio of about 0.5 to 2.0:1 fluoropolymer to binder. The weight ratios of fluoropolymer to binder disclosed herein are based on the cured film, the weight of these components in the applied layer formed by drying and baking (curing) the composition after application to the substrate. The baking drives off the volatile materials present in the coating composition, including the salt moiety of the polyamic acid salt as the imide bonds are formed during baking. For convenience, the weight of binder, when it is polyamic acid salt which is converted to polyamideimide by the baking step, can be taken as the weight of polyamic acid in the starting composition, whereby the weight ratio of fluoropolymer to binder can be determined from the amount of fluoropolymer and binder in the starting composition. When the composition for forming the present primer layer is in the preferred aqueous dispersion form, these components will constitute about 5 to 50 weight percent of the total aqueous dispersion.

Inorganic Film Hardner

The primer and midcoat layers of the present non-stick coating contain inorganic film hardner. The inorganic film hardener component in these layers is one or more non-metallic filler material that is inert with respect to the other components of the coating composition and thermally stable at the baking temperature used to fuse the fluoropolymer and polymer binder, if present. The film hardener is water insoluble so that it is typically uniformly dispersible but not dissolved in the aqueous dispersion form of the present compositions useful for forming the present primer and midcoat layers.

In one embodiment, the present inorganic film hardener comprises ceramic particles. These particles preferably have a Knoop hardness of at least about 1200 and more preferably of at least about 1500. Knoop hardness is a scale for describing the resistance of a material to indentation or scratching. Values for the hardness of minerals and ceramics are listed in the *Handbook of Chemistry*, 77th Edition, 12-186,187 based on reference material from Shackelford and Alexander, *CRC Materials Science and Engineering Handbook*, CRC Press, Boca Raton Fla., 1991. The film hardener components of the primer and midcoat layers imparts durability to the non-stick fluoropolymer composition applied as a coating on a substrate by deflecting abrasive forces applied to the coating surface and by resisting penetration of sharp objects that have penetrated the fluoropolymer topcoat and are travelling toward the primer layer and substrate.

In one embodiment, the average particle size of the present inorganic film hardner particles in the primer layer ranges from about 10 to 60 microns. In a preferred embodiment, the average particle size of the present inorganic film hardner particles in the primer layer ranges from about 21 to 44 microns. In one embodiment, the average particle size of the present inorganic film hardner particles in the midcoat layer ranges from about 1 to 60 microns. In a preferred embodiment, the average particle size of the present inorganic film hardner particles in the midcoat layer ranges from about 5 to 44 microns. Inorganic film hardner particles are available from a number of commercial sources, and particle size is reported as measured by sedimentation.

Example inorganic film hardeners include inorganic oxides, carbides, borides and nitrides having a Knoop hardness of at least about 1200. Preferred are inorganic oxides, nitrides, borides and carbides of zirconium, tantalum, titanium, tungsten, boron, aluminum and beryllium. Particularly preferred are silicon carbide and aluminum oxide. Typical Knoop hardness values for preferred inorganic compositions are: zirconia (1200); aluminum nitride (1225); beryllium (1300); zirconium nitride (1510); zirconium boride (1560); titanium nitride (1770); tantalum carbide (1800); tungsten carbide (1880); alumina (2025); zirconium carbide (2150); titanium carbide (2470); silicon carbide (2500); aluminum boride (2500); titanium boride (2850).

Primer Layer

The present non-stick coating includes as one element a continuous primer layer adhered to the substrate. The primer layer comprises polymer binder, fluoropolymer and inorganic film hardener particles. The primer layer serves multiple functions, it: strongly adheres to the substrate; strongly adheres to the other substantially fluoropolymer midcoat and topcoat layers it is in contact with and coated by; and provides substantial abrasion resistance to the present non-stick coating.

In the context of the primer layer, the term continuous means that the primer layer covers essentially all portions of the surface area of the substrate that is to be covered by the present non-stick coating.

In one embodiment, the cured dry film thickness of the primer layer is from about 16 to 30 microns. In a preferred embodiment, the cured dry film thickness of the primer layer is from about 18 to 22 microns.

In one embodiment, the relative amounts on a cured film basis of polymer binder, fluoropolymer and inorganic film hardner particles in the primer layer are from about 16 to 30 weight percent polymer binder, from about 16 to 50 weight percent fluoropolymer, and from about 25 to 60 weight percent of film hardner. In a preferred embodiment, the relative amounts on a cured film basis of polymer binder, fluoropolymer and inorganic film hardner particles in the primer layer are from about 18 to 22 weight percent polymer binder, from about 44 to 52 weight percent fluoropolymer, and from about 25 to 39 weight percent of film hardner.

In a preferred embodiment of the present non-stick coating the fluoropolymer of the present primer layer is PTFE, for example, Teflon™ PTFE DISP 30 manufactured by the Chemours Co. FC, LLC. In one embodiment, the present non-stick coating, the primer layer polymer binder comprises PAI, the primer layer fluoropolymer comprises PTFE, and the primer layer inorganic film hardner comprises silicon carbide.

In one embodiment, the primer layer contains inorganic film hardener particles having an average particle size of from about 20 to 45 microns.

Midcoat Layer

The present non-stick coatings achieve superior abrasion and scratch resistance by the presence in the coating of a discontinuous midcoat layer located at the interface of the primer and topcoat layers. The midcoat layer is a discontinuous layer comprising aggregate particles that are in contact with and adhered to the primer and topcoat layers. The aggregate particles are distributed discontinuously across the surface of the primer layer so as to reveal exposed areas of the surface of the primer layer showing through the discontinuous arrangement of particles forming the midcoat layer. From about 5 percent to about 20 percent of the aggregate particles are in clusters, wherein the clusters have a diameter of at least about 0.1 mm and height of at least about 0.016 mm. The height of a cluster relates to the distance measured normal to the surface of the primer layer to the outer edge of the highest point of a given cluster.

The aggregate particles and clusters of aggregate particles form the midcoat layer of the present coating. These particles extend through and define the thickness of the midcoat layer. These particles influence the topography of the topcoat layer applied on top of the midcoat layer, by telegraphing the size and shape of the aggregate particles and clusters of aggregate particles through the topcoat layer, resulting in abrasion forces and scratch forces being deflected away from the coating by these particles. This deflection reduces the instances of abrasive forces shredding the coating as well as reduces plastic deformation of the coating which would result in the removal of coating (scratching) and failure of the coating to provide a non-stick surface. The present inventive coating includes the presence of a discontinuous midcoat layer of aggregate particles and aggregate particle clusters in contact with and adhered to the primer layer and topcoat layer that function to deflect abrasive and scratch forces, while still retaining sufficient non-stick properties of the coating supplied by the fluoropolymer components of the coating. The present inventors discovered that the present discontinuous midcoat comprising aggregate particles and clusters of aggregate particles results in a coating (e.g., on the cooking surface of a frying pan) with improved scratch resistance (i.e., the coating better deflects cooking utensils such as fork, knife, spatula and whisk) over a like coating having a midcoat containing an identical amount of the same inorganic film hardner particles and fluoropolymer, however the inorganic film hardner particles being homogenously distributed in a midcoat layer as individual inorganic film hardner particles rather than being discontinuously distributed as aggregate particles and clusters of aggregate particles.

The discontinuous midcoat layer of the present non-stick coating can be better understood by reference to the present figures. FIG. 1 is a schematic of a transverse cross section of a substrate 10 having a non-stick coating 12 of the present invention. Relative sizes, shapes and scale of elements shown in FIG. 1 are distorted from actual for the purpose of more clearly illustrating these elements of the present coating. Continuous primer layer 14 is adhered to the substrate 10 in a continuous coating, covering essentially the entire surface of substrate 10. Discontinuous midcoat layer 16 comprises aggregate particles 16a through 16f in contact with and adhered to primer layer 14, the aggregate particles 16a through 16f being distributed discontinuously across the surface of the primer layer 14 so as to reveal exposed areas 18 of the surface of the primer layer 14 showing through the discontinuous midcoat layer 16. Topcoat layer 20 is in contact with and adhered to the midcoat layer 16 and also in contact with and adhered to the primer layer 14. Topcoat layer 20 is in contact with and adhered to the primer layer 14 at interfaces of the topcoat layer 20 and primer layer 14 existing at exposed areas 18 of the surface of the primer layer 14 where there are no aggregate particles 16a through 16f of the midcoat layer 16.

Referring to FIG. 1, the aggregate particles 16a through 16f of midcoat layer 16 are in contact with and adhered to the surface of the primer layer 14, and some are also adjacent to one another on the surface of the primer layer 14 and are in intimate contact with one another to form clusters of aggregate particles. In FIG. 1 two such clusters of aggregate particles are illustrated in cross-section. One such cluster of two aggregate particles is shown comprising aggregate particles 16a and 16b, and another such cluster of three aggregate particles is shown comprising aggregate particles 16d, 16e, and 16f. Sole aggregate particles are also present in midcoat layer 16 and are in contact with and adhered to the surface of the primer layer 14 but are not in intimate contact with another aggregate particle and are not a member of any aggregate particle cluster. A representative sole aggregate particle shown in FIG. 1 as not being a member of any aggregate particle cluster is aggregate particle 16c.

Figure 2:
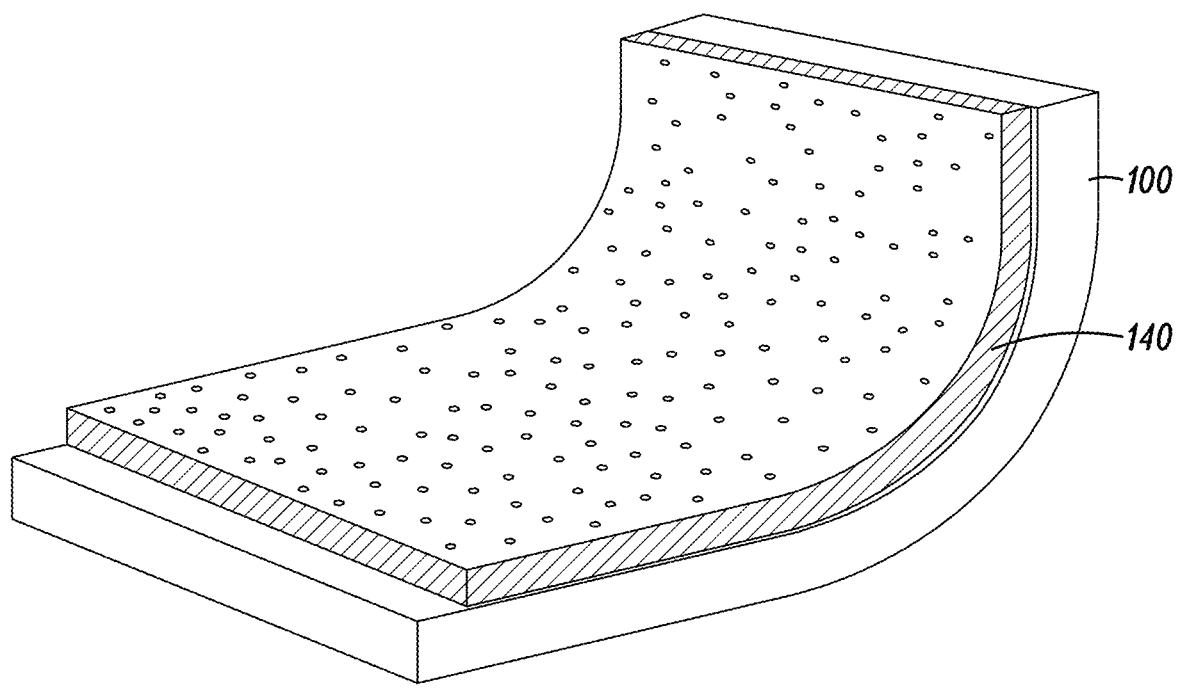
FIG. 2 is a rotated three-dimensional schematic representation of a transverse cross section of a substrate having a continuous primer layer of the present disclosure.

FIG. 2 is a rotated three-dimensional schematic representation of a transverse cross section of a substrate 100 and a continuous primer layer 140 adhered to the substrate 100 in a continuous coating and covering essentially the entire surface of the substrate 100. Relative sizes, shapes and scale of elements shown in FIG. 2 are distorted from actual for the purpose of more clearly illustrating these elements of the present coating.

Figure 3:
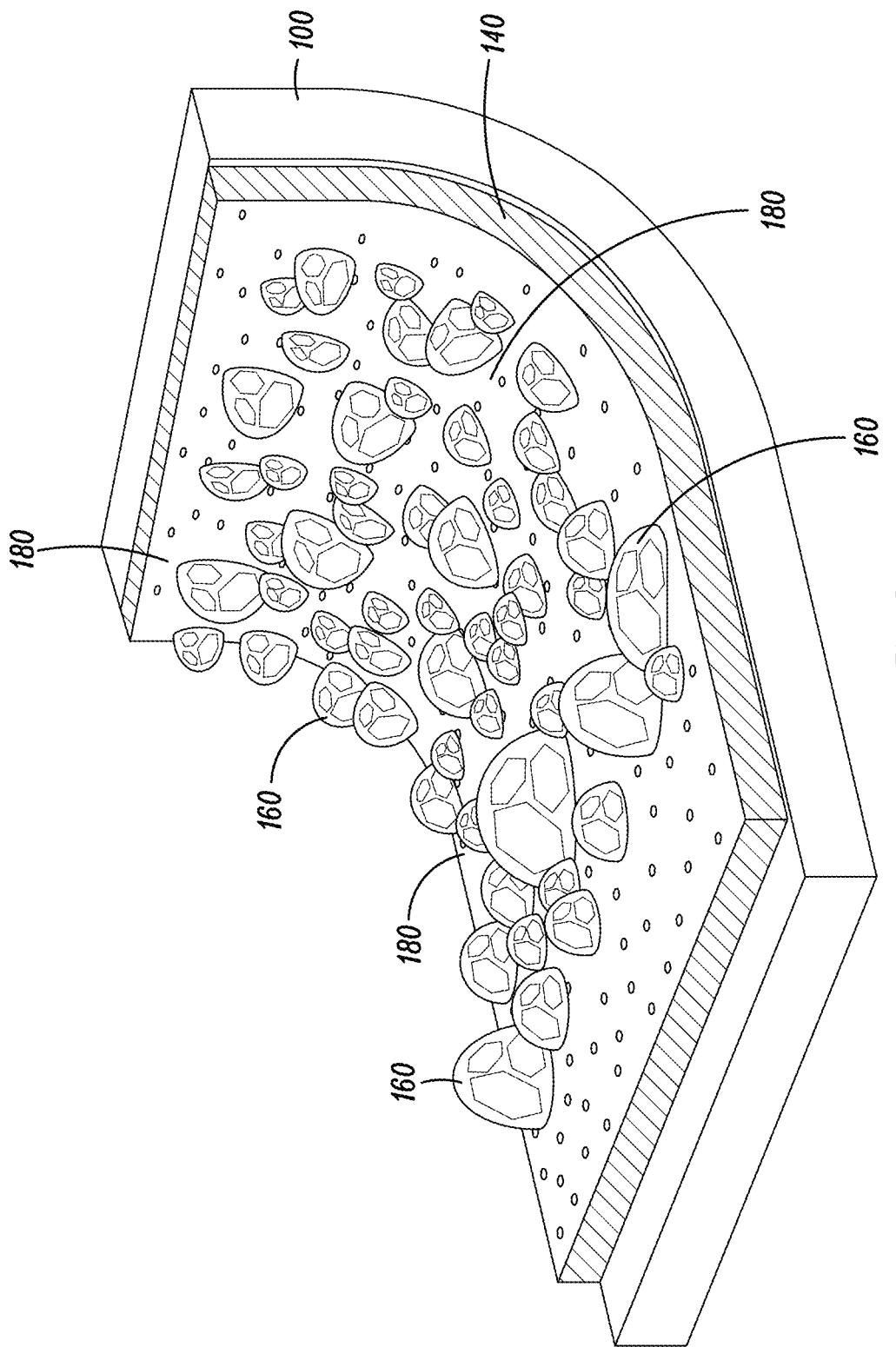
FIG. 3 is a rotated three-dimensional schematic representation of a transverse cross section of a substrate having a continuous primer layer and discontinuous midcoat layer of the present disclosure.

FIG. 3 is a rotated three-dimensional schematic representation of a transverse cross section of a substrate 100 having a continuous primer layer 140 adhered to the substrate 100 in a continuous coating and covering essentially the entire surface of the substrate 100, and a discontinuous midcoat layer comprising aggregate particles 160 (in FIG. 3 only three of the many illustrated aggregate particles are labeled 160) adhered to the primer layer 140 and distributed discontinuously across the surface of the primer layer so as to reveal exposed area 180 of the surface of the primer layer 140 that is not covered by aggregate particles 160. Relative sizes, shapes and scale of elements shown in FIG. 3 are distorted from actual to more clearly illustrate these elements of the present coating.

Figure 4:
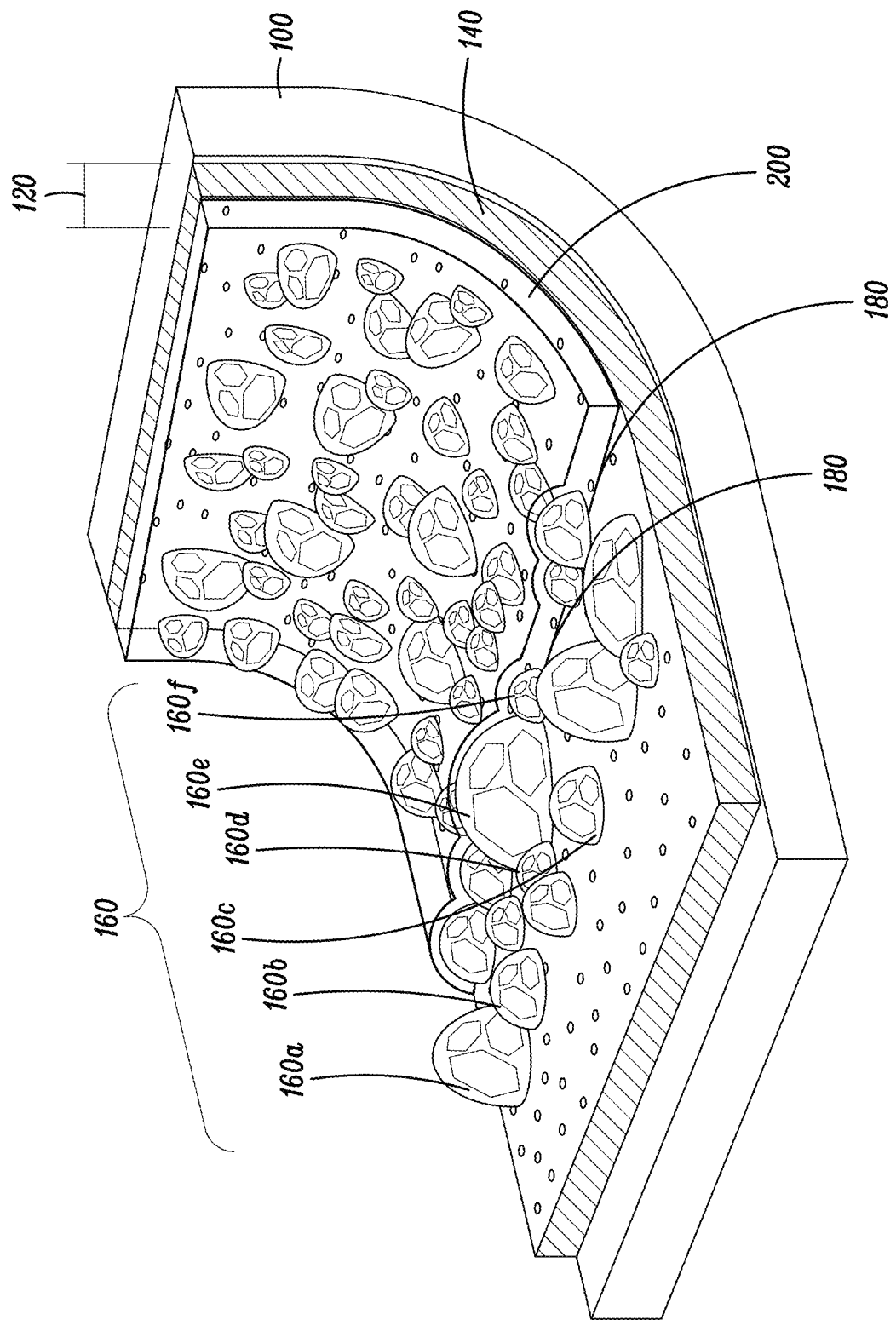
FIG. 4 is a rotated three-dimensional schematic representation of a transverse cross section of a coating of the present disclosure.

FIG. 4 is a rotated three-dimensional schematic representation of a transverse cross section of a substrate 100 having a non-stick coating 120 (comprising layers 140, 160 and 200) of the present invention. Relative sizes, shapes and scale of objects in FIG. 4 are distorted from actual for the purpose of more clearly illustrating certain elements of the present invention. Continuous primer layer 140 is adhered to the substrate 100 in a continuous coating and covers essentially the entire surface area of the substrate 100. Discontinuous midcoat layer 160 comprises aggregate particles (e.g., 160*a* through 160*f*) (in FIG. 4 only six of the many aggregate particles illustrated is labeled) adhered to the primer layer 140 and are distributed discontinuously across the surface of the primer layer to reveal exposed area 180 of the surface of primer layer 140 that is not covered by aggregate particles 160. Topcoat layer 200 is adhered to the midcoat layer 160. Topcoat layer 200 is also adhered to the primer layer 140 at interfaces of the topcoat layer 200 and primer layer 140 existing at exposed area 180 of the surface of the primer layer 140 that contain no aggregate particles (e.g., 160*a* through 160*f*) of the midcoat layer 160. In FIG. 4, a portion of the topcoat layer 200 illustration is cut back to more clearly show the example aggregate particles (e.g., 160*a* through 160*f*) of discontinuous midcoat layer 160.

Referring to FIG. 4, a portion of the aggregate particles of midcoat layer 160 in contact with and adhered to the surface of the primer layer 140 are adjacent to one another on the surface of primer layer 140 and in intimate contact with one another forming clusters of aggregate particles. FIG. 4 illustrates a number of such clusters of aggregate particles, for example, one cluster of two aggregate particles is represented by 160*a* and 160*b*, and another cluster of three aggregate particles is represented by 160*d*, 160*e*, and 160*f*. Solitary aggregate particles are also present in midcoat layer 160 and are in contact with and adhered to the surface of the primer layer 140 but are not in intimate contact with another aggregate particle and are thus not part of an aggregate particle cluster. In FIG. 4 one example of a solitary aggregate particle not a member of any aggregate particle cluster is aggregate particle 160*c*. Relative sizes, shapes and scale of elements shown in FIG. 4 are distorted from actual for the purpose of more clearly illustrating these elements of the present coating.

Figure 5:
FIG. 5 is a plan view microscopy photograph at ×55 magnification of a coating of the present disclosure.
Figure 5:
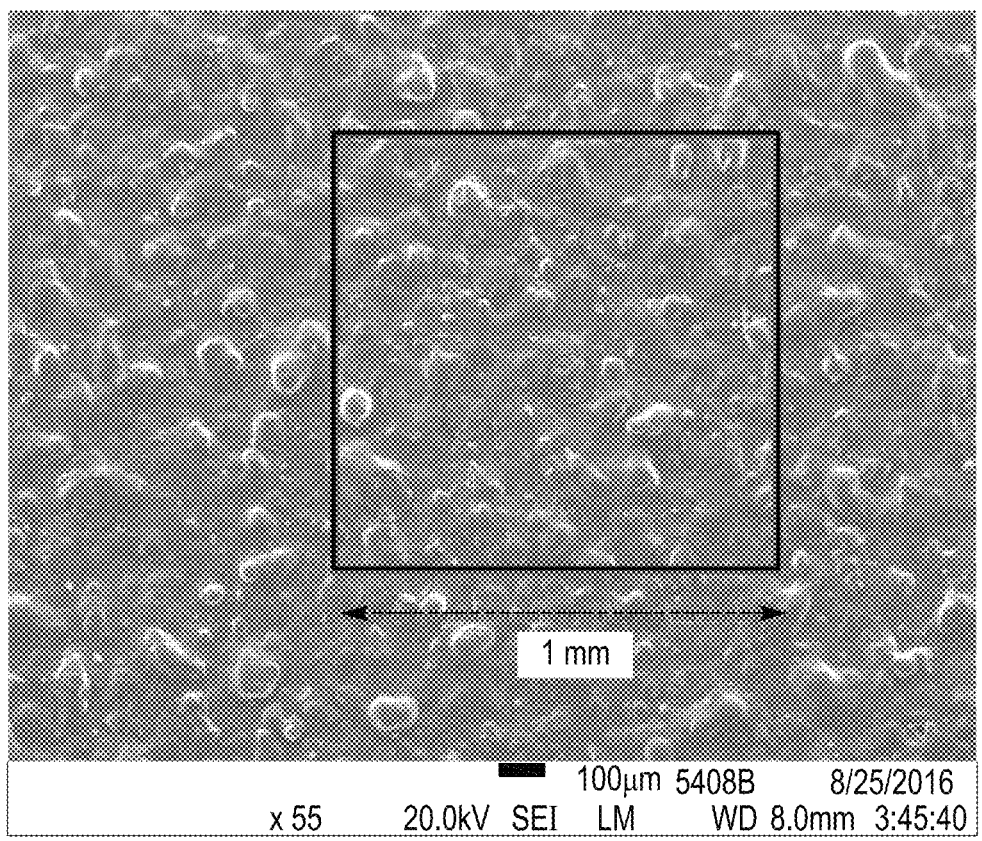
Figure 6:
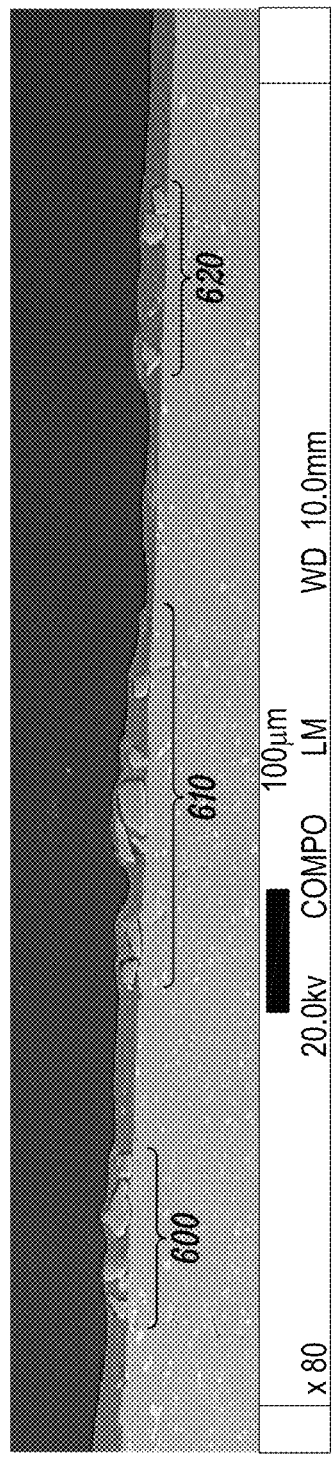
FIG. 6 is a transverse cross section view microscopy photograph at ×80 magnification of a coating of the present disclosure.

FIG. 5 is a photomicrograph at ×55 magnification of a plan view of a present inventive coating. FIG. 6 is a photomicrograph at ×80 magnification of a transverse cross section of a present inventive coating. Three clusters of aggregate particles are visible in FIG. 6, identified therein as 600, 610, and 620. FIG. 5 and FIG. 6 are from different example non-stick coatings.

The aggregate particles and clusters of aggregate particles forming the midcoat layer of the present coating are comprised of fluoropolymer and inorganic film hardner particles. In one embodiment of the present midcoat layer, the aggregate particles comprising fluoropolymer and inorganic film hardner particles have an average particle size of from about 0.1 to 4 mm. In another embodiment of the present midcoat layer, the aggregate particles comprising fluoropolymer and inorganic film hardner particles have an average particle size of from about 0.1 to 1 mm.

In one embodiment of the present non-stick coating, the discontinuous midcoat layer comprises aggregate particles adhered to the primer layer and distributed discontinuously across the surface of the primer layer so as to reveal exposed areas of the surface of the primer layer, wherein from about 5 to 20 percent of said aggregate particles are in clusters having a diameter at least about 0.1 mm and height of at least about 0.016 mm. In another embodiment of the present non-stick coating, the clusters have a diameter at least about 0.2 mm and height of at least about 0.016 mm. In another embodiment of the present midcoat layer, the clusters have a diameter in the range of at least about 0.1 mm to 4 mm and a height of at least about 0.016 mm. In another embodiment of the present midcoat layer, the clusters have a diameter in the range of at least about 0.2 mm to 4 mm and a height of at least about 0.016 mm. The height of a cluster relates to the distance measured normal to the surface of the primer layer to the outer edge of the highest point of a given cluster. In another embodiment, the clusters have any diameter as stated previously herein and a height in the range of from about 0.016 mm to no greater than about 0.1 mm. In another embodiment, the clusters have any diameter as stated previously herein and a height in the range of from about 0.016 mm to no greater than about 0.070 mm. The present inventors discovered that clusters with a diameter above 4 mm are less desirable, as they can lead to the incorporation of air passages within such clusters, which can undesirably result in collapse of such clusters or lead to cracking of the coating following curing or when the coating surface is contacted with solid articles (e.g., a cooking utensil). The present inventors discovered that clusters with a diameter below 0.2 mm, and certainly those below 0.1 mm, are also less desirable, as the resultant non-stick coating containing such clusters does not exhibit superior scratch resistance.

In one embodiment of the present non-stick coating, the discontinuous midcoat layer comprises aggregate particles adhered to the primer layer and distributed discontinuously across the surface of the primer layer so as to reveal exposed areas of the surface of the primer layer, wherein from about 5 to 20 percent of the aggregate particles are in clusters. In a preferred embodiment, about 15 percent of the aggregate particles are in clusters.

In one embodiment, the relative amounts of fluoropolymer and inorganic film hardner particles in the midcoat layer on a cured basis are from about 78 to 88 weight percent fluoropolymer and from about 7 to 15 weight percent of inorganic film hardner particles, with the remaining weight percent of the midcoat layer (up to 100%) comprising other optional components, for example, colored pigment or mica. In another embodiment, the relative amounts of fluoropolymer and inorganic film hardner particles in the midcoat layer on a cured basis are from about 81 to 85 weight percent fluoropolymer and from about 9 to 13 weight percent of inorganic film hardner particles, with the remaining weight percent of the midcoat layer (up to 100%) comprising other optional components, for example, colored pigment or mica.

In one embodiment, the midcoat layer of the present coating comprising fluoropolymer and inorganic film hardner particles has a weight per square meter on a cured basis of from about 0.05 to 0.25 g/m$^2$. In another embodiment, the midcoat layer of the present coating comprising fluoropolymer and inorganic film hardner particles has a weight per square meter on a cured basis of from about 0.1 to 0.2 g/m$^2$. In another embodiment, the midcoat layer of the present coating comprising fluoropolymer and inorganic film hardner particles has a weight per square meter on a cured basis of from about 0.12 to 0.18 g/m$^2$.

In a preferred embodiment of the present midcoat layer, the fluoropolymer comprises PTFE and the inorganic film hardener comprises silicon carbide.

Topcoat Layer

The present non-stick coating includes as one element a continuous topcoat layer comprising a fluoropolymer adhered to the midcoat layer and also adhered to the primer layer at interfaces of the topcoat layer and primer layer existing at exposed areas of the surface of the primer layer that contain no particles of the midcoat layer.

In one embodiment, the topcoat layer comprises fluoropolymer and is substantially free of inorganic film hardener particles.

In the context of the topcoat layer, the term continuous means that the topcoat layer coating covers essentially all portions of the surface area of the midcoat layer and the exposed areas of the surface of the primer layer that contain no particles of the midcoat layer.

In one embodiment, the cured dry film thickness of the topcoat layer is from about 14 to 22 microns. In a preferred embodiment, the cured dry film thickness of the topcoat layer is from about 16 to 20 microns.

In a preferred embodiment of the present non-stick coating the fluoropolymer of the present topcoat layer is PFA or MFA.

Application of the Layers

Each of the layers of the present non-stick coating can be applied sequentially to the substrate by conventional means, preferably in the form of a liquid medium, and more preferably wherein the liquid of the medium comprises water and the composition being applied to the substrate is an aqueous dispersion.

Spray coating is an appropriate application method for applying the layers of the present non-stick coating, and in one embodiment the layers are applied sequentially, wet on wet, and then cured. In one embodiment, the midcoat composition is applied onto the primer layer prior to its drying. However, when the primer and midcoat compositions are aqueous dispersions, the midcoat composition can also be applied to the primer layer after drying to touch. In a preferred embodiment, a wet midcoat layer is immediately coated by a topcoat composition, and then the coating is cured. When the primer layer is made by applying the primer composition from an organic solvent, and the midcoat layer is applied from an aqueous medium, the primer layer should be dried so that all water-incompatible solvent is removed before application of the midcoat. The adhesion properties of the primer to the substrate and intercoat adhesion will manifest themselves upon drying and baking (curing) of the midcoat layer together with the drying and baking of the primer and topcoat to form the non-stick coating on the substrate.

In one embodiment, the composition for forming the midcoat layer is a liquid dispersion comprising fluoropolymer and inorganic film hardener (midcoat composition). In one embodiment, the midcoat composition is sprayed onto a dried primer layer at a temperature of from about 30 to 50° C., using a conventional spray apparatus appropriately adjusted to result in a discontinuous midcoat layer comprising aggregate particles in contact with and adhered to primer layer, the aggregate particles being distributed discontinuously across the surface of the primer layer so as to reveal exposed areas of the surface of the primer layer. About 5 percent to 20 percent of the aggregate particles of the midcoat layer in contact with and adhered to the surface of the primer layer are also adjacent to one another on the surface of the primer layer and are in intimate contact with one another so as to form clusters of aggregate particles. A conventional spray apparatus can be used to form the present midcoat layer and depending on viscosity of the liquid and the product, atomizing and hook-pressure, the size and density of the aggregates can be determined. Aggregate particles can also be formed by using specific round jet nozzle spray-guns by mixing the midcoat composition (separately fed) and the air (atomizing air), also separately fed in the aircap at the front of spray gun. By pushing the liquid midcoat composition through a straight hole (solid stream principle) liquid droplets containing the present aggregate particles are formed. Several of these holes in combination with a certain air cap with defined opening will generate the amount of aggregates leaving the spray gun. In one example embodiment of use of such a spray apparatus, the spray on pressure can be from about 1.0 to 2.0 kg/cm$^2$, the fluid delivery pressure can be from about 0.4 to 1 kg/cm$^2$, the rotation speed of the holders can be between about 60 and 120 rpm (with 80-100 being recommended), and the distance of the guns to the substrate being coated is between about 20 and 25 cm. The shape of the clusters of aggregate particles, their amount, and the distribution between relatively small and relatively large clusters has a contribution on the abrasion and scratch resistance of the coated substrate. The shape and the amounts of the clusters of aggregate particles can be influenced by changing known control variables of operation of such spray apparatus, for example, changing the fluid pressure from the pressure pot to the gun, changing the atomization pressure, or changing the rotational speed of the holders. Appropriate modification of such spray apparatus variables to achieve a desired midcoat layer result as claimed herein will be within the skill of the person of average skill in this field.

The resultant layered coating can be baked to fuse all the coatings at the same time to form the present non-stick coating on the substrate. When the fluoropolymer is PTFE, a quick high bake temperature is preferred, e.g., for about 3 to 5 minutes at a temperature starting at about 800° F. (427° C.) and rising to 815° F. (435° C.). When the fluoropolymer in the primer or the midcoat is a blend of PTFE and FEP, e.g., about 50-70 wt. % PTFE and about 50-30 wt. % FEP, the bake temperature may be reduced to about 780° F. (415° C.), rising to 800° F. (427° C.) in about 3 minutes (total bake time).

In one embodiment, the resultant coated substrate has a primer layer thickness of from about 16 to 30 microns. In another embodiment, the cured dry film thickness of the primer layer is from about 18 to 22 microns. In one embodiment, the midcoat layer is thicker than the primer layer and is more preferably at least about 50% thicker. The thickness of the midcoat layer is established by the particle size of the aggregate particles, and clusters of aggregate particles, comprising fluoropolymer and inorganic film hardner particles as described earlier herein. The thickness of the midcoat layer that contains aggregate particles, and clusters of aggregate particles, can be measured by the eddy-current principle (ASTM B244) or the magnetic induction test method (ASTM 7091), depending on the substrate used, after curing. The eddy current or magnetic induction values reflect an average of values across the substrate including the height of particles and the depth of the valleys between particles. This method is applied to the building-up of the layers of coating on a substrate in the formation of the non-stick coating. The primer layer thickness can also be measured on the baked non-stick coating by sectioning the coated substrate, e.g. frying pan, and measuring the thickness from a micrograph obtained by use of a scanning electron microscope (SEM). By using SEM, a distinction can be made between the height of the aggregate particles, and clusters of aggregate particles, and the depth of the valley between such particles. Typically, SEM values that report the primer thickness in the valley between particles are about 50% of reported eddy current or magnetic induction values.

Substrate

The present substrates can be a metal or ceramic, examples of which include aluminum, anodized aluminum, cold-rolled steel, stainless steel, enamel, glass, and pyroceram. These materials may form the entire substrate or in the case of composite materials, just the surface of the substrate. In one embodiment, the substrate can be smooth and cleaned, i.e. having a surface profile of less than about 50 microinches (1.25 µm) as measured by a model RT 80 surface tester made by Alpa Co. of Milan, Italy or any or any equivalent surface roughness tester being able to measure separate peak counts and peaks distribution as well the Roughness Average (Ra), the total height of the roughness profile (Rt) and the mean roughness depth (Rz). For pyroceram and some glass, improved results are obtained by activation of the substrate surface such as by a slight chemical etch, which is not visible to the naked eye, i.e., the surface is still smooth. The substrate can also be chemically treated with an adhesion agent such as a mist coat of polyamic acid salt, such as disclosed in U.S. Pat. No. 5,079,073.

The present substrates coated with a non-stick coating can find commercial application in products such as cookware (e.g., frying pans), bakeware, rice cookers and inserts thereof, water pots, iron sole plates, conveyors, chutes, roll surfaces, cutting blades, and the like.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

Test Methods

Computer Aided Mechanical Utensil Tester (CAMUT)

The CAMUT apparatus wear tests non-stick coatings on surfaces and is designed to simulate typical cooking situations such as cutting, scratching, scraping and stirring encountered in daily use of non-stick cooking surfaces. Its application is based on the patterns of movement that are performed everyday by humans while cooking. This test measures the resilience of the cookware in extreme situations.

The CAMUT apparatus is described by R. Walter, G. Bechtold, K. Friedrich, P. Thomas in Mechanische Verschleissprüfung von Antihaftbeschichtungen mit automatisierter Bewertung der Oberflächen (i.e., Mechanical Wear Test of Non-stick Coatings with Automated Surface Evaluation), Material Prüfung (i.e., Material Testing) 43 (2001) 467-472, and also by R. Walter, G. Bechtold, K. Friedrich in Eine Prüfmaschine für Bratpfannen (i.e., A Testing Machine for Frying Pans), Uni-Spektrum 3 (2000) 50-55.

CAMUT simulates wear of non-stick cooking surfaces utilizing a testing head having four separate kitchen tools (fork, knife, spatula, whisk), each having its own calibrated load and each independently operating different movements on the coated substrate (cooking surface) to damage the coating, simulating damage caused by a human in the course of cooking on the non-stick cooking surface. Each tool can be removed to be replaced by another type or replaced when worn as required. Each tool has an independent load (dead weight). The movement of the tool across the surface of the coated substrate is controlled by a microprocessor and two X-Y axes allowing for many types of movement (geometric to random). Each testing tool follows a standard pattern and runs several cycles following the pattern. The complete testing routine per coated substrate (e.g., frying pan) takes 2 hours and runs 40 cycles in total, including linear cuttings (10 cycles for 90 seconds), followed by linear scratching & circular stirring (20 cycles for 190 seconds and 60 cycles for 360 seconds respectively), followed by linear back and forth movements (10 cycles for 48 seconds), followed by usual circular movements of stirring (10 cycles for 80 seconds). The coated substrate is also heated to 200° C. for the duration of the test.

The purpose of the CAMUT testing method is to determine the scratch resistance of an applied coating onto a substrate (e.g., casserole or fry pan). After the completion of the 40 cycles and cooling the tested item to room temperature, the tested item is compared with standard pictures to determine a scratch-rating. The scratch-rating ranges from 1 (heavily damage, significant amount of coating removed from, and/or scratches through to, the substrate, bare substrate evident) to 9 (nearly undamaged, essentially no coating removed from, and/or scratches through to, the substrate) and is assigned by visual observation versus the standard pictures.

EXAMPLES

Fluoropolymer

PTFE dispersion: Chemours TFE fluoropolymer resin dispersion grade 40, available from the Chemours Company, Wilmington, Del., with commercial name PTFE Fluoroplastic Dispersion DISP 40, with density of dispersion 1.51 g/cm$^3$ (at 60% solids) measured according to ASTM D4441 and average diameter dispersion particle size 0.23 micrometers.

FEP Dispersion: Chemours FEP fluoropolymer resin dispersion, available from the Chemours Company, Wilmington, Del., with commercial name FEP Fluoroplastic Dispersion FEPD 121, a TFE/HFP fluoropolymer resin dispersion with a solids content of 55% measured according to ASTM D4441 and average diameter dispersion particle size 0.18 micrometers, the resin having an HFP content of from 10.6-12.8 wt. % and a melt flow rate of 8 g/10 min. measured at 372° C. by the method of ASTM D2116.

PFA dispersion: Chemours PFA fluoropolymer resin dispersion, available from the Chemours Company, Wilmington, Del., with commercial name PFA Fluoroplastic Dispersion PFAD 335D. with density of dispersion 1.50 g/cm$^3$ (at 60% solids) measured according to ASTM D4441 and average diameter dispersion particle size 0.20 micrometers and a melt flow rate of 2 g/10 min. measured at 372° C. by the method of ASTM D2116.

Polymer Binder

Polyamic acid polymer—Polyamic acid salt is generally available as polyamic acid having an inherent viscosity of at least 0.1 as measured as a 0.5 wt % solution in N,N-dimethylacetamide at 30° C. It is dissolved in a coalescing agent such as N-methyl pyrrollidone, and a viscosity reducing agent, such as furfuryl alcohol and reacted with tertiary amine, preferably triethyl amine to form the salt which is soluble in water, as described in greater detail in U.S. Pat. No. 4,014,834 (Concannon).

Inorganic Film Hardener

Silicon carbide supplied by Elektroschmelzwerk Kempten GmbH (ESK), Munich Germany.

F 1000=5.0-7.0 micrometers median grain size dS50
P 1200=41.8-44.8 micrometers median grain size dS50
P 600=20.6-22.6 micrometers median grain size dS50
P 320=5.0-7.0 micrometers median grain size dS50

The average particle size is measured by sedimentation using FEPA-Standard-43-GB 1984R 1993 resp. ISO 6344 according to information provided by the supplier.

Comparative Example 1 (CE1)—Two-Coat System

A primer liquid coating composition containing PTFE resin, FEP resin, polyamic acid polymer binder and aqueous solvent is prepared according to the composition in Table 1. A topcoat liquid coating composition containing PTFE resin, PFA resin, acrylic polymer resin and aqueous solvent is prepared according to the composition in Table 2.

TABLE 1

| Ingredients | Weight Percent |
| --- | --- |
| Water | 40.36 |
| Furfuryl alcohol | 1.20 |
| Aluminum oxide dispersion (40 wt. % solids) | 19.71 |
| Channel black aqueous dispersion (31 wt. % solids) | 1.23 |
| Ultramarine blue aqueous dispersion (53 wt. % solids) | 3.35 |
| Polyamic acid polymer | 18.43 |
| Alpha silicon carbide P1200 | 0.22 |
| Ethoxylated acetylenic diols | 0.14 |
| PTFE dispersion | 6.94 |
| FEP dispersion | 5.15 |
| Alumina modified silica (10-50 wt. % solids) | 3.14 |
| Tergitol | 0.13 |
| Total | 100.00 |

TABLE 2

| Ingredients | Weight Percent |
| --- | --- |
| PFA dispersion | 3.29 |
| Ultramarine blue aqueous dispersion (53 wt. % solids) | 0.32 |
| Tergitol | 0.88 |
| Mica/TiO$_2$/tin oxide wet | 0.66 |

TABLE 2-continued

| Ingredients | Weight Percent |
| --- | --- |
| Mica/TiO$_2$ wetted | 1.56 |
| Water | 8.62 |
| Solvent surfactant (mixture of triethanolamine and other solvents) | 8.15 |
| Acrylic polymer | 11.90 |
| PTFE dispersion | 63.58 |
| Channel black aqueous dispersion (31 wt. % solids) | 1.04 |
| Total | 100.00 |

A smooth aluminum substrate is treated by washing to remove grease but is not mechanically roughened. A two-coat non-stick coating system of primer/topcoat without SiC particles in the primer is spray coated onto the substrate. The composition of the primer is listed in Table 1. The primer is spray coated in a continuous layer onto the substrate at a dried and cured dry film thickness of 10-15 μm. The primer layer is dried at a temperature of 120-150° C. in an air oven, and then cooled to a temperature of 35-45° C. before the topcoat is applied. The composition of the topcoat is listed in Table 2. The topcoat is spray coated at a dry film thickness of 15-20 μm onto the dried primer. The combined primer/topcoat layer is dried at a temperature of 120-150° C. in an air oven. The combined primer/topcoat layer is then cured at a temperature of 428-435° C. for 3 to 5 minutes. The total dry film thickness of the obtained two coat system is 25 μm.

Comparative Example 2 (CE2)—Three-Coat System—Continuous Midcoat

A primer liquid coating composition containing PTFE resin, FEP resin, PAI binder and aqueous solvent is prepared according to the composition of Table 7 of U.S. Pat. No. 6,291,054. A midcoat liquid coating composition containing PTFE resin, PFA resin, acrylic resin, alumina and aqueous solvent is prepared according to the composition of Table 8 of U.S. Pat. No. 6,291,054. A topcoat liquid coating composition containing PTFE resin, PFA resin, acrylic resin and solvent is prepared according to the composition in Table 9 of U.S. Pat. No. 6,291,054.

A smooth aluminum substrate is treated by washing to remove grease but is not mechanically roughened. A three-coat non-stick coating system of primer/midcoat/topcoat with SiC particles in the primer is spray coated in a continuous layer onto the substrate. The composition of the primer is listed in Table 7 of U.S. Pat. No. 6,291,054. The primer layer is dried at a temperature of 120-150° C. in an air oven and then cured at a temperature of 428-435° C. for 3 to 5 minutes. The dry film thickness of the primer measured after curing is 18-22 μm. The substrate containing the cured primer layer is cooled to a temperature of 35-45° C. before the mid- and topcoat application. A continuous midcoat is spray coated in a conventional fashion where the midcoat liquid composition is atomized by air pressure in a spray-gun to create a cloud of midcoat liquid composition droplets that are directed towards and deposited onto the cured primer, forming a continuous layer of the midcoat liquid composition on the cured primer layer. The midcoat and topcoat are each applied at a dry film thickness of 15-20 μm onto the cured primer. The topcoat is applied wet on wet onto the midcoat. After drying of the midcoat and topcoat (as per the primer), the total primer/midcoat/topcoat coating system is cured at a temperature of 428-435° C. for 3 to 5 minutes. The total dry film thickness after curing of the obtained three-coat primer/midcoat/topcoat coating system is 42 μm.

Example 1 (E1)—Three-Coat System—Discontinuous Midcoat

A primer liquid coating composition containing PTFE resin, FEP resin, PAI binder and aqueous solvent is prepared according to the composition of Table 7 of U.S. Pat. No. 6,291,054. A topcoat liquid coating composition containing PTFE resin, PFA resin, acrylic resin and solvent is prepared according to the composition in Table 9 of U.S. Pat. No. 6,291,054. A midcoat liquid coating composition containing PTFE resin, silicon carbide and solvent is prepared according to the composition in Table 3.

TABLE 3

| Ingredients | Weight Percent |
| --- | --- |
| PTFE Dispersion | 78.72 |
| Triethanolamine | 5.62 |
| Ultramarine blue aqueous dispersion (53 wt. % solids) | 2.06 |
| Water | 1.87 |
| Alpha silicon carbide P600 | 1.53 |
| Alpha silicon carbide P1200 | 1.53 |
| Silicon carbide F1000 | 1.53 |
| Alpha silicon carbide P320 | 1.53 |
| Butyldiglycol | 1.47 |
| Oleic acid | 1.17 |
| Tergitol | 1.44 |
| Red blue mica pearl box | 0.86 |
| Cerium octoate | 0.55 |
| Polydimethylsiloxane filler | 0.12 |
| Zinc oxide | trace |
| Total | 100 |

A smooth aluminum substrate is treated by washing to remove grease but is not mechanically roughened. A three-coat non-stick coating system of primer/midcoat/topcoat is spray coated onto the substrate. The composition of the primer is as listed in Table 7 of U.S. Pat. No. 6,291,054. The primer is spray coated in a continuous layer onto the substrate. The primer layer is dried at a temperature of 120-150° C. in an air oven and then cured at a temperature of 428-435° C. for 3 to 5 minutes. The dry film thickness of the primer measured after curing is 20-24 μm. The substrate containing the cured primer layer is cooled to a temperature of 35-45° C. before the mid- and topcoat application. The midcoat is a reinforced system with different sizes of SiC that is applied in a discontinuous layer onto the cured primer. For discontinuous application, the midcoat liquid coating composition is atomized in a standard-automatic spray-gun, for example equipped with a nozzle size of at least 1.0 mm (combined with an appropriate air cap) and a maximum of 1.5 mm nozzle size (combined with and appropriate air cap) and operated at very low air pressure (0.3-0.6 bar air pressure) creating droplets that are spattered onto the primer resulting in the present discontinuous midcoat layer. The discontinuous midcoat layer contains aggregate particles adhered to the primer layer and distributed discontinuously across the surface of the primer layer so as to reveal exposed areas of the surface of the primer layer. For example, from about 5 percent to about 20 percent of the aggregate particles are in clusters, and after curing are found to have a diameter of at least 0.1 mm and height of at least 0.016 mm as measured from the surface of the primer layer, and the midcoat layer has a weight per square meter (on a cured basis) of from about 0.05 to 0.25 g/m². The topcoat is spray coated wet on wet as a continuous coating at a dry film thickness of 15-20 μm onto the wet midcoat. After drying of the midcoat and topcoat (as per the primer), the total primer/midcoat/topcoat coating system is cured at a temperature of 428-435° C. for 3 to 5 minutes. The total dry film thickness after curing of the obtained three-coat primer/midcoat/topcoat coating system is 42 μm.

Comparative Example 3 (CE3)—Three-Coat System—Continuous Midcoat

The materials and procedure of Example 1 are repeated, and the amount of midcoat layer delivered on a weight per square meter of cured coating basis are the same as for Example 1, except that the midcoat of this comparative example is spray coated onto the cured primer as a continuous layer.

TABLE 4

Summary of Inorganic Film Hardner Content in Primer and Midcoat Layers

| | | Primer | | | | Midcoat | | |
| --- | --- | --- | --- | --- | --- | --- | --- | --- |
| Exam- | Wt. % | Weight % SiC | | | | Weight % SiC | | |
| ple | alumina | P120 | P600 | P400 | P320 | P1200 | P600 | F1000 |
| CE1 | 19.6 | 0 | 0 | 0 | 0 | 0 | 0 | 0 |
| CE2 | 17.2 | 5.8 | 0 | 0 | 5.8 | 0 | 0 | 0 |
| E1 and CE3 | 13.7 | 0 | 2.4 | 2.4 | 2.4 | 1.5 | 1.5 | 1.5 |

TABLE 5

CAMUT TESTING RESULTS

| Example | Midcoat application | CAMUT Test Rating |
| --- | --- | --- |
| CE1 | Continuous | 5-6 |
| CE2 | Continuous | 7-8 |
| CE3 | Continuous | 7-8 |
| E1 | Discontinuous | 9 |

The CAMUT testing results show that the abrasion and scratch resistance of the coatings of the present invention (E1) utilizing the present discontinuous midcoat is greatly improved over that of comparative coatings utilizing a continuous midcoat.

What is claimed is:
1. A substrate coated with a non-stick coating resistant to abrasion and scratching, said non-stick coating comprising:
 i.) a continuous primer layer adhered to said substrate, said continuous primer layer comprising a polymer binder, a first fluoropolymer and first inorganic film hardener particles,
 ii.) a discontinuous midcoat layer comprising aggregate particles adhered to said continuous primer layer and distributed discontinuously across the surface of said continuous primer layer so as to reveal exposed areas of the surface of said continuous primer layer, wherein from about 5 percent to about 20 percent of said aggregate particles are in clusters having a diameter of at least about 0.1 mm and height of at least 0.02 mm as measured from the surface of said continuous primer layer, and wherein said aggregate particles comprise a second fluoropolymer and second inorganic film hardener particles, and iii.) a topcoat layer comprising a third fluoropolymer adhered to said discontinuous midcoat layer and said exposed areas of the surface of said continuous primer layer wherein said first inorganic film hardener particles and said second inorganic film hardener particles independently comprise ceramic particles having a Knoop hardness of at least about 1,200.

2. The substrate of claim 1, wherein said first fluoropolymer is PTFE, said second fluoropolymer is PTFE that is the same or different from said PTFE of said first fluoropolymer, and said third fluoropolymer is PFA or MFA.

3. The substrate of claim 1, wherein said fluoropolymers as a component of each layer of said coating comprises about 10 to about 45 weight percent of all cured components of said continuous primer layer, at least about 70 weight percent of all cured components of said discontinuous midcoat layer, and at least about 90 weight percent of all cured components of said topcoat layer.

4. The substrate of claim 1, wherein the average particle size of the first inorganic film hardener particles in said continuous primer layer ranges from about 10 to about 60 microns, and the average particle size of the second inorganic film hardener particles in said discontinuous midcoat layer ranges from about 5 to about 44 microns.

5. The substrate of claim 1, wherein said aggregate particles comprising said second fluoropolymer and said second inorganic film hardener particles have an average particle size of from about 0.1 to about 4 mm.

6. The substrate of claim 1, wherein said aggregate particles comprising said second fluoropolymer and said second inorganic film hardener particles have an average particle size of from about 0.1 to about 1 mm.

7. The substrate of claim 1, wherein said clusters have a diameter at least about 0.2 mm.

8. The substrate of claim 1, wherein said clusters have a diameter of at least about 0.2 mm to about 4 mm.

9. The substrate of claim 1, wherein said clusters have a height in the range of from 0.02 mm to no greater than about 0.1 mm.

10. The substrate of claim 1, wherein said clusters have a height in the range of from 0.02 mm to no greater than about 0.07 mm.

11. The substrate of claim 1, wherein about 15 percent of the number of aggregate particles are contained in clusters.

12. The substrate of claim 1, wherein said discontinuous midcoat layer has a weight per square meter on a cured basis of from about 0.05 $g/m^2$ to about 0.25 $g/m^2$.

13. The substrate of claim 1, wherein said discontinuous midcoat layer has a weight per square meter on a cured basis of from about 0.1 $g/m^2$ to about 0.2 $g/m^2$.

14. The substrate of claim 1, wherein said discontinuous midcoat layer has a weight per square meter on a cured basis of from about 0.12 $g/m^2$ to about 0.18 $g/m^2$.

15. The substrate of claim 1, wherein said first inorganic film hardener particles and said second inorganic film hardener particles are independently selected from the group consisting of inorganic oxides, nitrides, borides and carbides of zirconium, tantalum, titanium, tungsten, boron, aluminum and beryllium.

16. The substrate of claim 1, wherein said first inorganic film hardener particles and said second inorganic film hardener particles comprise silicon carbide.

17. The substrate of claim 1, wherein said first inorganic film hardener particles and said second inorganic film hardener particles comprise aluminum oxide.

18. The substrate of claim 1, wherein the non-stick coating has a Computer Aided Mechanical Utensil Tester (CAMUT) test rating of 9.

* * * * *